United States Patent [19]

Peyton et al.

[11] Patent Number: 4,936,991

[45] Date of Patent: Jun. 26, 1990

[54] ACCORDION PLEATED FLUID FILTERING ELEMENT

[75] Inventors: Richard H. Peyton, Berkley; Horace M. Misturado, Assonet, both of Mass.

[73] Assignee: Allied-Signal Inc., Morristown, N.J.

[21] Appl. No.: 912,092

[22] Filed: Sep. 29, 1986

[51] Int. Cl.$^5$ .............................................. B01D 33/01
[52] U.S. Cl. .................................... 210/356; 210/398; 210/444; 210/493.5
[58] Field of Search ............... 210/356, 359, 398, 444, 210/493.5, DIG. 17; 55/361, 475, 521

[56] References Cited

U.S. PATENT DOCUMENTS

| | | | |
|---|---|---|---|
| 1,696,313 | 12/1928 | Liddell | 210/356 |
| 2,186,440 | 1/1940 | Williams | 210/169 |
| 2,556,521 | 6/1951 | Chase | 210/493.5 X |
| 3,062,378 | 11/1962 | Briggs | 210/493.5 |
| 3,219,191 | 12/1962 | Suchy | 210/266 |
| 4,102,792 | 7/1978 | Harris | 210/493.5 X |

Primary Examiner—W. Gary Jones
Assistant Examiner—Wanda L. Millard
Attorney, Agent, or Firm—Ken C. Decker; William N. Antonis

[57] ABSTRACT

A liquid filter includes a filtering medium of a collapsed cylindrical form which defines cooperating accordian pleats that form contaminant collecting walls. The medium is self-supporting, and divides the filter into inlet and outlet chambers across the medium. When the restriction of the medium increases, thereby increasing the pressure differential across the medium, the accordian pleats collapse until corrugations on the pleats engage with one another, thereby resisting further collapse of the medium. As the pressure differential increases still further to the extent that the corrugations are collapsed, a part of each fold is kept apart by adjacent double thickness portion of the fold or pleat, so that a minimum flow of liquid through the filter is maintained.

6 Claims, No Drawings

ACCORDION PLEATED FLUID FILTERING ELEMENT

BACKGROUND OF THE INVENTION

This invention relates to a liquid filter.

The capacity of a liquid filter, such as the kind used to filter lubricating oil of an internal combustion engine, is limited by the amount of filtering media used in the filter. Since the volume available is almost always a given because of lack of space available around a modern internal combustion engine, the problem becomes one of packing as much filtering medium as possible into the available volume. Of course, cost is also a consideration, and cost can only be minimized by providing a filter having the minimum number of parts, thereby eliminating the expense of the parts eliminated and reducing the cost of the labor in their assembly.

SUMMARY OF THE INVENTION

The present invention proposes a filtering medium for a liquid filter which is accordian pleated; that is, a filtering media which has contaminant collecting walls that diverge radially outwardly and converge radially inwardly from inner and outer fold lines. In this way, substantially more filtering medium can be packed into a given volume, compared to the prior art filters. Another feature of the present invention is that the accordian pleated medium is made of a filtering paper or other material which is stiff enough so that external end caps and center tube supports are not required, thereby permitting the filtering media to collapse upon itself as the medium is used and restriction across the medium increases. Collapse of the media is resisted by corrugations on the contaminant collecting walls which tend to maintain the separation between the walls and thereby permit the fluid filtrate to pass therethrough.

DESCRIPTION OF RELATED ART

Although accordian pleated media has been proposed before, (see, for example, U.S. Pat. No. 2,556,521 to Chase), the potential for increasing the volume of media packed into a given space in accordian pleated filters has not been realized because the prior art accordian pleated filters, such as Chase, required external end caps and center tube supports to maintain the pleats spaced apart, thereby obviating the inherent advantage of accordian pleated filters.

Accordingly, this invention has the advantage of providing substantially more filtering medium in a given volume at a reduced cost. These and other advantages of the present invention will become apparent from the following description, with reference to the accompanying drawings, in which:

BRIEF DESCRIPTION OF THE DRAWING

FIG. 1 is a longitudinal cross-sectional view of a liquid filter made pursuant to the teachings of the present invention in which the filtering medium is relatively new and unrestricted;

FIG. 2 is a view similar to FIG. 1 but illustrating the liquid filter after use and that the filtering medium has become somewhat restricted;

FIG. 3 is a view taken substantially along line 3—3 of FIG. 1;

FIG. 4 is a perspective view of the filtering medium used in the liquid filter of FIG. 1;

FIG. 5 is a cross-sectional view taken substantially along lines 5—5 of FIG. 4;

DESCRIPTION OF THE PREFERRED EMBODIMENT

Figure 6:
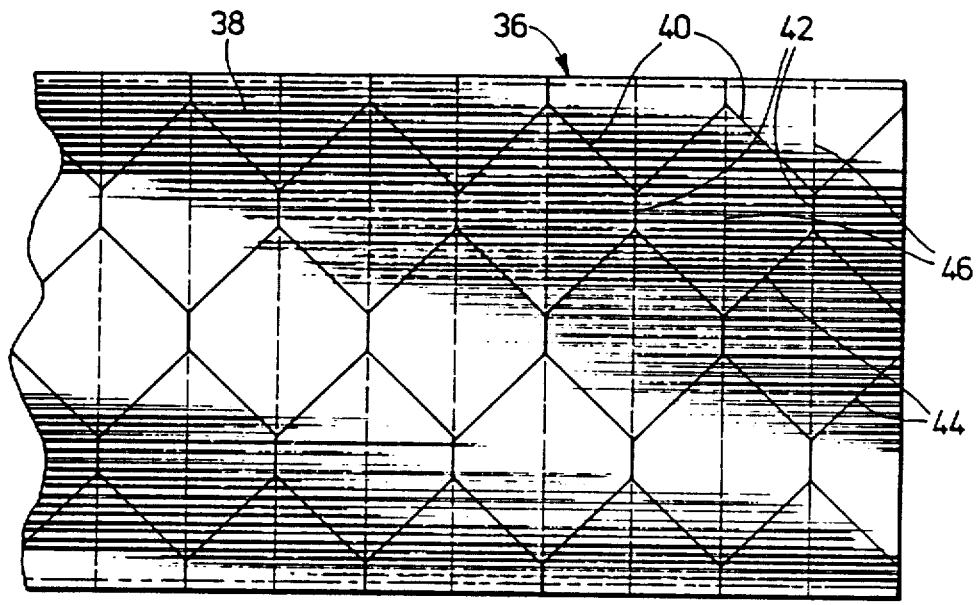
FIG. 6 is a plan view of the sheet of filtering media used to make the filtering medium used in the oil filter of FIG. 1.

Referrring now to the drawings, a liquid filter generally indicated by the numeral 10 includes a cup-shaped metal housing 12 and open end 14 which is closed by a closure member or tapping plate 16. The tapping plate 16 includes a threaded orifice 18 that is adapted to be screwed onto a threaded stud projecting from the internal combustion engine on which the filter 10 is used. Tapping plate 16 further includes circumferentially spaced inlet openings 20, which communicate fluid into the housing 12, and a circumferentially extending seal 22, which is adapted to sealingly engage the internal combustion engine. The threaded orifice 18 serves as an outlet from the housing 12.

A filtering medium generally indicated by the numeral 26 is installed within the cup-shaped housing 12. An antidrainback valve 24 is sealed to the bottom of the medium 26 and is also sealingly engaged with the tapping plate 16 at the orifice 18 to thereby provide a sealing connection between the orifice 18 and the internal passage 30 defined within the medium 26. The antidrainback valve 24 includes a portion 28 that prevents drain back of the liquid in the housing 12 when the engine is not running. A conventional relief valve 32 is installed in the opposite end of the medium 26, and functions to open to permit bypass of the medium during an overpressure condition. The medium 26 is in the form of a collapsed cylinder to define accordian pleats generally indicated by the numeral 34.

Figure 7:
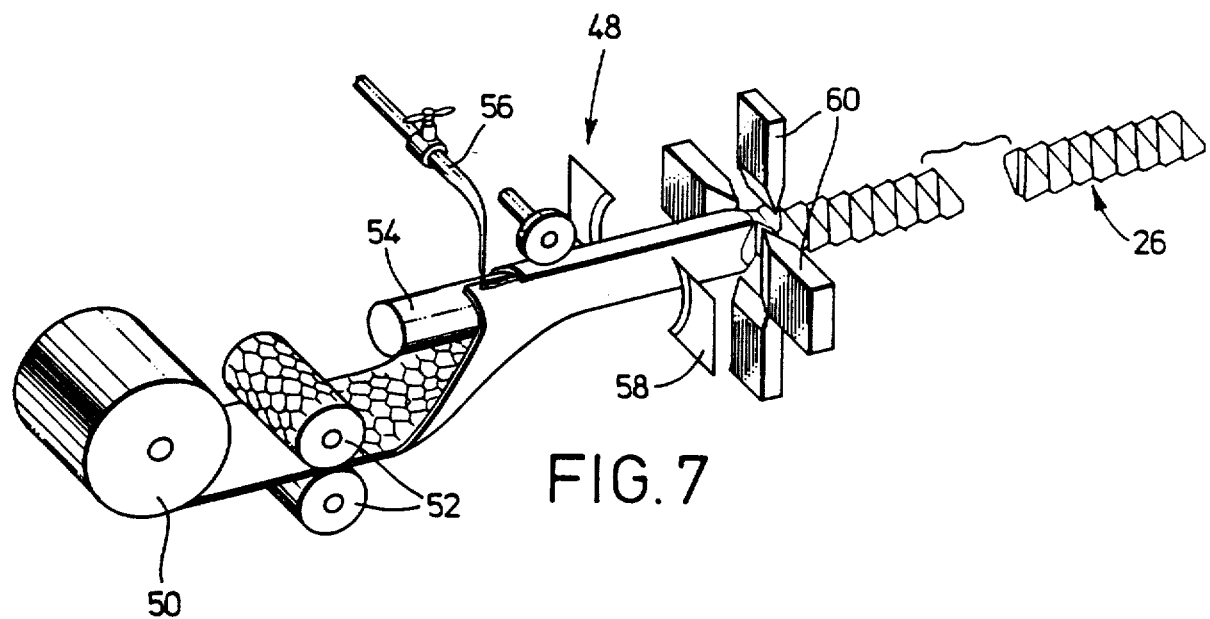
FIG. 7 is a perspective view of the equipment used in manufacturing the filtering medium used in the liquid filter of FIG. 1.

Referring now to the FIGS. 6 and 7, the accordian pleated medium 26 is made from a flat sheet of stock generally indicated by the numeral 36. The stock 36 would normally be paper, although any foldable filter material may be used. The sheet of 36 is corrugated, a few of the corrugations being indicated at 38. The sheet 36 is then scored along score lines 40, 42, 44, and 46 which because of the scoring will cause the material to fold more easily along the scored lines.

Referring to the apparatus indicated by the numeral 48 in FIG. 7 which scores, folds, and cuts the filtering medium, the corrugated stock is stored on roll 50 and fed through scoring rollers 52 which scores the stock with the score lines 40, 42, 44, and 46. This stock is then guided around a forming mandrel 54, where an adhesive is dispensed by a spigot 56 onto the seam formed by bringing the adjaucent sides of the stock together around the forming mandrel 54 to form the stock into a cylinder around the mandrel. Instead of applying an adhesive, the seam may be formed by sonic bonding. A cut-off knife 58 severs the cylinder so formed at predetermined intervals, or the cylinder may be perforated to break off at proper size after forming. Folding arms generally indicated by the numeral 60 apply pressure to the score lines, causing the stock to fold in the accordian pleated manner best illustrated in FIGS. 3-5. Because of the corrugations in the stock, the medium 26 tends to be self-supporting, thereby obviating the need for end caps, center tube supports, inner and outer screens, etc. which were necessary in the prior art devices.

Referring to FIG. 4, which illustrates the medium 26 in slightly expanded form for clarity, each of the pleats 34 is defined by contaminant collecting walls 62, 64, 66, and 68 which converge radially inwardly from, or diverge radially outwardly from, the inner and outer fold lines 70, 72 (with respect to the axis defined by the cylinder from which the accordian pleated element 26 is folded). The corrugations 38 extend across each of the aforementioned walls, and, as best illustrated in FIG. 4, the corrugations on adjacent walls 66, 68 are formed such that they engage corresponding corrugations on adjacent walls as the medium is compressed.

Medium 26 is compressed by the action of the contaminant collecting walls catching the contaminants in the liquid filtered by the medium. Accordingly, as the walls collect contaminants, the pressure differential across the medium between the inlet chamber 76 and the outlet chamber defined by the passage 30 will increase. Because the medium or element 26 is without external support, the increasing pressure differential tends to compress the medium, such that the adjacent pleats 34 compress upon one another, as best illustrated in FIG. 2. The medium is illustrated in FIG. 2 after the filter has been used for a considerable period of time, thus substantially increasing the pressure differential across the medium from that which existed with the fairly new filter illustrated in FIG. 1. However, when the medium collapses to the extent illustrated in FIG. 2, the corrugations 38 on adjacent contaminant collecting walls, 66, 68 or 62, 64 line up with one another and the tips of the corrugations engage with one another where the corrugations cross, to thereby resist further collapse of the medium.

However, it should be apparent that, when the pressure differential across the medium 26 increases still further, the increased pressure will cause the corrugations to collapse, thereby packing the adjacent contaminant collecting walls against one another. As can best be seen in FIG. 3, the medium is pleated such that the pleats 34 do not extend all the way into the axis of the cylinder from which the pleats are formed. Accordingly, triangular shaped portions 80 are formed by contaminant collecting walls which are backed up by portions of adjacent contaminant collecting walls. For example, and referring to FIG. 4, the triangularly shaped portions 80 on the adjacent walls 66, 68 are backed up by portions of the walls 62, 64 when the medium 26 is collapsed to the accordian pleated configuration. However, adjacent rectangularly shaped portions 82 are not backed up by an adjacent contaminant collecting wall. Accordingly, the portions 80 of each wall that are backed up by an adjacent wall form a thickness twice as thick as the adjacent rectangular portion 82, which is not backed up. Accordingly, even after the corrugations 38 are collapsed by an increase in pressure differential across the medium, the extra thickness provided by the backed-up portions 80 tend to maintain separation of the rectangularly shaped portions 82. Accordingly, the triangular portions 80 maintain some separation between adjacent retangular portions 82, to thereby permit fluid flow through the filter (although this fluid flow will be highly restricted) even after the pressure differential has increased to such an extent that the corrugations 38 on adjacent pleats have collapsed.

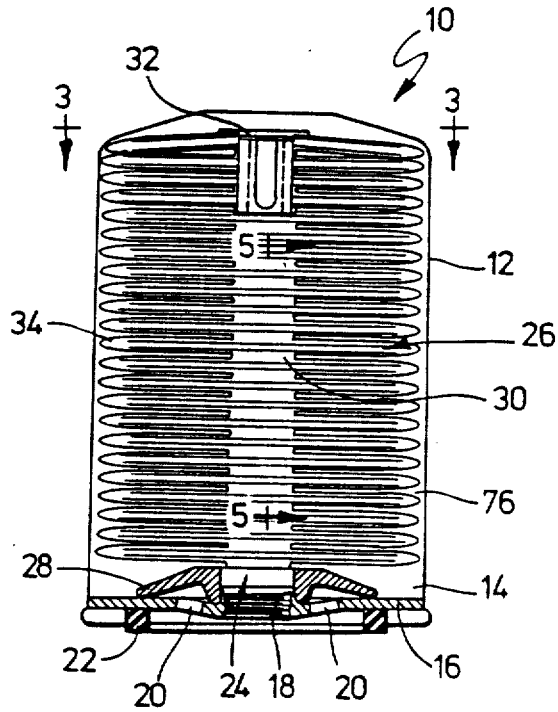

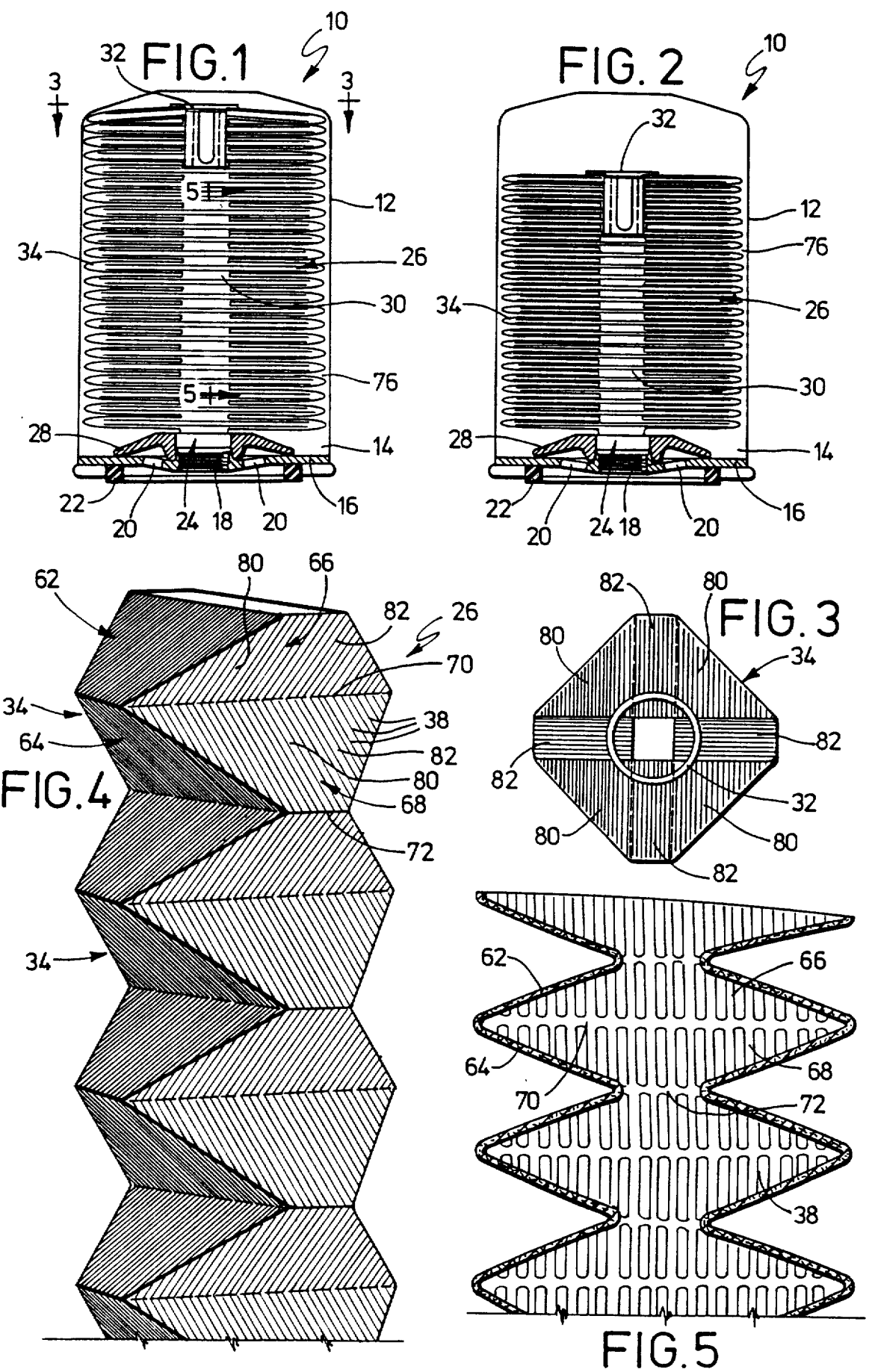

We claim:

1. Liquid filter for filtering a liquid filtrate comprising a filtering medium of a collapsed cylindrical form to define accordion pleats cooperating to form contaminant collecting walls that converge radially inwardly and diverge radially outwardly with respect to the axis of said cylindrical form from inner and outer fold lines, a housing for said medium, said housing having an inner surface, said medium defining a first chamber between the contaminant collecting walls of said medium and the inner surface of said housing and a second chamber defined within said medium by said contaminant collecting walls, said first chamber being communicated with an inlet port, said second chamber being communicated with an outlet port, said medium having substantial rigidity to define an initial height within said housing before the medium is used and restriction across said medium is minimal, said medium collapsing axially on itself from said initial height to a height less than said initial height as the contaminant collecting walls collect contaminant thereby increasing the resistance to fluid flow through the walls to increase the pressure differential between said chambers, said medium having a pair of opposite ends, one of said ends being secured to a corresponding portion of the housing, the other end of said medium being free of restraint within said housing to permit said other end to collapse toward said one end of said medium as the restriction to fluid flow through to medium increases, said medium including means for resisting further collapse of said medium after the latter has collapsed to a predetermined height, said collapse resisting means including corrugations on said contaminant collecting walls, said corrugations on adjacent walls engaging one another when the medium collapses to a predetermined height to resist further collapse of said medium.

2. Liquid filter as claimed in claim 1, wherein said housing includes a cup-shaped member defining a cavity and having an open end and a closure member for said open end, said one end of said medium being secured to said closure member and projecting into said cavity when the closure member is installed on said cup-shaped member.

3. Liquid filter as claimed in claim 1, wherein the corrugations on adjacent contaminant collecting walls defining an outwardly facing pleat run substantially parallel to one another whereby the corrugations on one wall engage the corresponding corrugations on the other wall when the medium has collapsed to said predetermined height to resist further collapse of the medium.

4. Liquid filter as claimed in claim 3, wherein said pleats project toward said axis for a predetermined distance, said predetermined distance being less than the distance between said outer fold line and said axis whereby the medium includes alternate portions around its circumference having greater and fewer layers of said medium, the portion of greater layers maintaining the portions of fewer layers apart sufficiently upon collapse of said medium sufficient to flatten the corrugations to permit said filtrate to penetrate the portion of the medium having fewer layers.

5. Liquid filter for filtering a liquid filtrate comprising a filtering medium of a collapsed cylindrical form to define accordion pleats cooperating to form contaminant collecting walls that converge radially inwardly and diverge radially outwardly with respect to the axis of said cylindrical form from inner and outer fold lines, a housing for said medium, said housing having an inner surface, said medium defining a first chamber between the contaminant collecting walls of said medium and the inner surface of said housing and a second chamber defined within said medium by said contaminant collecting walls, said first chamber being communicated with an inlet port, said second chamber being communicated with an outlet port, said medium having substantial rigidity to define an initial height within said housing before the medium is used and restriction across said medium is minimal, said medium collapsing axially on itself from said initial height to a height less than said initial height as the contaminant collecting walls collect contaminant thereby increasing the resistance to fluid flow through the walls to increase the pressure differential between said chambers, adjacent contaminant collecting walls of said pleats defining corrugations thereon, said corrugations on adjacent walls engaging one another when the medium collapses to a predetermined height to resist further collapse of said medium.

6. Liquid filter for filtering a liquid filtrate comprising a filtering medium of a collapsed cylindrical form to define accordion pleats cooperating to form contaminant collecting walls that converge radially inwardly and diverge radially outwardly with respect to the axis of said cylindrical form from inner and outer fold lines, a housing for said medium, said housing having an inner surface, said medium defining a first chamber between the contaminant collecting walls of said medium and the inner surface of said housing and a second chamber defined within said medium by said contaminant collecting walls, said first chamber being communicated with an inlet port, said second chamber being communicated with an outlet port, said medium having substantial rigidity to define an initial height within said housing before the medium is used and restriction across said medium is minimal, said medium collapsing axially on itself from said initial height to a height less than said initial height as the contaminant collecting walls collect contaminant thereby increasing the resistance to fluid flow through the walls to increase the pressure differential between said chambers, said pleats projecting toward said axis for a predetermined distance, said predetermined distance being less than the distance between said outer fold line and said axis, whereby the medium including alternate portions around its circumference having greater and fewer layers of said medium, the portion of greater layers maintaining the portion of fewer layers apart sufficiently to permit said filtrate to penetrate the portions of the medium having fewer layers.

* * * * *

UNITED STATES PATENT AND TRADEMARK OFFICE
CERTIFICATE OF CORRECTION

PATENT NO. : 4,936,991

DATED : June 26, 1990

INVENTOR(S) : Richard H. Peyton, et al

Page 1 of 4

It is certified that error appears in the above-identified patent and that said Letters Patent is hereby corrected as shown below:

The title page should be deleted to appear as per attached title page.

The sheets of Drawing consisting of Figs. 1-7 should be added as per attached sheet.

Signed and Sealed this

Eighth Day of October, 1991

*Attest:*

HARRY F. MANBECK, JR.

*Attesting Officer*  *Commissioner of Patents and Trademarks*

United States Patent [19]

Peyton et al.

[11] Patent Number: 4,936,991
[45] Date of Patent: Jun. 26, 1990

[54] ACCORDION PLEATED FLUID FILTERING ELEMENT

[75] Inventors: Richard H. Peyton, Berkley; Horace M. Misturado, Assonet, both of Mass.

[73] Assignee: Allied-Signal Inc., Morristown, N.J.

[21] Appl. No.: 912,092

[22] Filed: Sep. 29, 1986

[51] Int. Cl.$^5$ ............................................. B01D 33/01
[52] U.S. Cl. ................................... 210/356; 210/398; 210/444; 210/493.5
[58] Field of Search ............... 210/356, 359, 398, 444, 210/493.5, DIG. 17; 55/361, 475, 521

[56] References Cited

U.S. PATENT DOCUMENTS

| | | | |
|---|---|---|---|
| 1,696,313 | 12/1928 | Liddell | 210/356 |
| 2,186,440 | 1/1940 | Williams | 210/169 |
| 2,556,521 | 6/1951 | Chase | 210/493.5 X |
| 3,062,378 | 11/1962 | Briggs | 210/493.5 |
| 3,219,191 | 12/1962 | Suchy | 210/266 |
| 4,102,792 | 7/1978 | Harris | 210/493.5 X |

Primary Examiner—W. Gary Jones
Assistant Examiner—Wanda L. Millard
Attorney, Agent, or Firm—Ken C. Decker; William N. Antonis

[57] ABSTRACT

A liquid filter includes a filtering medium of a collapsed cylindrical form which defines cooperating accordian pleats that form contaminant collecting walls. The medium is self-supporting, and divides the filter into inlet and outlet chambers across the medium. When the restriction of the medium increases, thereby increasing the pressure differential across the medium, the accordian pleats collapse until corrugations on the pleats engage with one another, thereby resisting further collapse of the medium. As the pressure differential increases still further to the extent that the corrugations are collapsed, a part of each fold is kept apart by adjacent double thickness portion of the fold or pleat, so that a minimum flow of liquid through the filter is maintained.

6 Claims, 2 Drawing Sheets